United States Patent
Zandian

[11] Patent Number: 6,081,653
[45] Date of Patent: Jun. 27, 2000

[54] COLOR IMAGING

[75] Inventor: Said Zandian, Agoura, Calif.

[73] Assignee: Hitachi Koki Imaging Solutions, Inc., Simi Valley, Calif.

[21] Appl. No.: 08/768,317

[22] Filed: Dec. 17, 1996

Related U.S. Application Data

[63] Continuation-in-part of application No. 08/088,463, Jul. 7, 1993, Pat. No. 5,611,022.

[51] Int. Cl.⁷ ................................................ G06F 15/00
[52] U.S. Cl. ........................ 395/109; 358/456; 382/252
[58] Field of Search ................................. 395/109, 104, 395/101; 358/465, 466, 455, 456, 457, 534, 535, 447, 445, 443, 448, 458, 459, 298, 536; 382/252, 251, 167, 237, 270, 162, 274, 254; 345/150, 147, 431, 432, 136, 137, 138

[56] References Cited

U.S. PATENT DOCUMENTS

| | | | |
|---|---|---|---|
| 5,051,844 | 9/1991 | Sullivan | 358/456 |
| 5,268,774 | 12/1993 | Eschbach | 358/466 |
| 5,485,183 | 1/1996 | Zandian et al. | 347/41 |
| 5,611,022 | 3/1997 | Estrada et al. | 395/109 |

*Primary Examiner*—Dov Popovici
*Attorney, Agent, or Firm*—Pillsbury Madison & Sutro

[57] ABSTRACT

A multi-level printer is controlled to selectively enhance each pel, based on an error diffusion process. However, each channel (e.g., RGB red, green and blue color channels; Lab luminance, red direction and blue direction channels; or other suitable channel division) is processed individually according to a suitable kernel to provide a multi-color image. The printer is capable of providing a plurality of "actual" levels of enhancement to a pel for any particular channel. The "desired" image defines a "desired" level of enhancement for each pel in each channel. Correlation bins are defined for each actual level of enhancement for associating each "desired" level of enhancement for each pel in each channel with an actual level of enhancement. An error value based upon the selected actual level of enhancement and the desired level of enhancement is diffused to the neighboring pels according to a kernel. Also, the order of processing individual pels and the error diffusion matrix are both reversed for each subsequent line of pels. It has been found that each one and various combinations of these features significantly improves image clarity, sharpness and tone continuity.

12 Claims, 5 Drawing Sheets

COLOR IMAGING

This is a Continuation in Part of application Ser. No. 08/088,463 to Estrada et al., filed Jul. 7, 1993, issuing as U.S. Pat. No. 5,611,022.

BACKGROUND OF THE INVENTION

1. Field of the Invention

The present invention relates to improved color imaging systems and methods of making and using the same and, in particular embodiments, to such systems and methods for improved color image printing wherein the status of a picture element is determined based, in part, on error factors which are dependent on the status of neighboring picture elements.

2. Description of Related Art

One well known process of forming an image (such as a graphic design, alphanumeric character, or other indicia formed by a printer, cathode ray tube, LED or other electronic display device) is to divide the area in which the image is to be formed into a plurality of discrete picture elements ("pels"). Each pel is then selectively enhanced, such that the combined plurality of pels forms the desired image.

In many printing environments, the printing system's ability to "selectively enhance" a picture element is "bi-level", in that it is limited to either forming a dot (a black, bright or color spot) or not forming a dot at the picture element location. In such bi-level systems, selected areas (composed of multiple pels) of the image may be made to appear in various shades (e.g., shades of grey, bright or color) by enhancing various numbers of interspaced pels located within the area.

Spacial grey scale techniques for controlling a printer or other imaging apparatus have been used in such bi-level systems to improve the visual appearance of the shaded areas of the printed image. One example of such spacial grey scale techniques is described in the article titled "An Adaptive Algorithm for Spatial Grey Scale" by Robert Floyd and Louis Steinberg, published in SID Digest ("Floyd et al").

Floyd et al. describe an error diffusion system, wherein the processing of one pel in an image is dependent upon the processing of other pels in the image, t o provide a more continuous tone image with a bi-level device. An algorithm is used to determine the manner in which the error (the difference between the desired level of darkness and the actual state of the picture element) is diffused among neighboring pels.

According to Floyd et al.'s system, the "actual" enhancement or brightness of a pel is bi-level, either 0 (dark) or 1 (bright However, the "desired" brightness at that pel's location in the picture may be anywhere between or including 0 and 1. Accordingly, each pel introduces an error (the difference between the "actual" state of the pel and the "desired" brightness level of the pel) into the picture. For example, if the "desired" brightness level for a pel is ¼, but the pel's "actual" state is dark (0), an error of −¼ is introduced into the picture. On the other hand, if the "desired" brightness for the pel is ¼ and the "actual" state of the pel is bright (1), an error of +¾ is introduced into the picture. Floyd et al. employ the matrix or "kernel" below to determine the distribution of (diffuse) the error introduced by each pel.

```
      * 7
3 5 1
```

The "*" represents the pel being processed and the numbers "7", "3", "5" and "1" represent weighting factors and locations for neighboring pels that have not yet been processed. The error introduced by the "*" pel is distributed as 7/16th's, 3/16th's, 5/16th's and 1/16th's to pels 7, 3, 5 and 1, respectively. The "Jarvis kernel," described by Jarvis, et al. shown below is an enhancement of the Floyd et al. "kernel."

```
      * 7 5
3 5 7 5 3
1 3 5 3 1
```

However, such matrix systems previously tended to generate defects near the peripheral edges of the image. Moreover, the image quality and continuity of tone in the image were often not as optimal as desired. As a result, the images formed by such systems tended to be blurry and lacking in detail.

Another technique for "grey scaling" is referred to as "screening," wherein the level of enhancement (darkness, brightness or color) of a pel is determined by the number of adjacently disposed small dots which are formed at the pel location. Thus, a lightly enhanced pel may be formed of one or two adjacently disposed small dots, while a highly enhanced pel may be formed of, for example, nine adjacently disposed small dots. According to further grey scaling techniques, the level of enhancement of a pel is controlled by adjusting the size of the dot formed at the pel location.

U.S. Pat. No. 5,485,183, assigned to Dataproducts Corporation, describes an interlaced dot-on-dot printing technique which is another technique for providing more than two enhancement levels for a pel. In this technique, up to two dots are printed in a pel to provide more than two enhancement levels. The two dots may be of a smaller size and a larger size to provide six enhancement levels in a pel. Super pels formed by four pels may be formed in a region to quadruple the number of enhancement levels over the super pel area.

These processes however require a printing system which is capable of forming a selectable and variable number of adjacently disposed small dots or a selectable and variable size dot for each pel location (i.e., the printing system must be other than a bi-level system). Additionally, while these processes provide more than two enhancement levels, the difference between the "desired" brightness and the "actual" enhancement level (selected from more than two enhancement levels) introduces errors into the image.

SUMMARY

Accordingly, it is an object of the present invention to provide an improved color image printing system and method for printing images with improved continuity, sharpness, detail and general image quality in a multi-level printing system.

A preferred embodiment of the present invention is directed to a printer capable of printing more than two intensity levels for each color channel on a pel. Multiple thresholds for each color channel define correlation bins for associating the desired intensity of each pel with an actual enhancement level that the printer is capable of providing. An error based upon the desired intensity level and the associated actual intensity level is diffused to the neighboring pels. By printing with more than two intensity levels, it is possible to reduce the magnitude of the errors that are diffused to the neighboring pels over systems limited to printing only two intensity levels.

In another embodiment of the present invention, a multi-level printer is controlled to selectively enhance each pel, based on an error diffusion process of the type as discussed above with respect to the Floyd, et al. kernel or the Jarvis kernel (or based on other suitable kernels). However, unlike the processes described by Floyd et al. and Jarvis et al., in preferred embodiments, each channel (e.g., RGB red, green and blue color channels; Lab luminance, red direction and blue direction channels; or other suitable channel division) is processed individually according to a suitable kernel to provide a multi-color image.

It has been found that each one and various combinations of these features significantly improves image clarity, sharpness and tone continuity.

BRIEF DESCRIPTION OF THE DRAWINGS

The detailed description will be made with reference to the accompanying drawings, wherein like numerals designate corresponding parts in the several figures.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of embodiments of the invention. The scope of the invention is best defined by the appended claims.

Embodiments of the present invention are directed to an apparatus and processes for printing (or displaying in other forms) color images with improved continuity in tones, clarity and general image quality, in a printing system capable of printing one or more intensity levels for a channel on a single pel. As described in more detail below, according to a preferred embodiment of the present invention, a bi-level or multi-level printer is controlled to selectively enhance each pel, based on an error diffusion process of the type as discussed above with respect to the Floyd, et al. kernel or the Jarvis kernel (or based on other suitable kernels).

However, unlike the processes described by Floyd et al. and Jarvis et al., in preferred embodiments, each color channel (e.g., red, green, blue) is processed individually according to a suitable kernel to provide a multi-color image. In an embodiment of the present invention directed to a color bi-level printer, an individual "threshold" level (by which the "actual" state of enhancement of a pel is determined) is calculated for each color channel, based on the minimum and maximum enhanced levels of all of the pels in the "desired" image.

Other embodiments of the present invention are directed to a printer capable of printing more than one intensity level for a black and white or color channel. Multiple thresholds define correlation "bins" corresponding to the printable "actual" intensity levels. Each "desired" intensity of a channel for a pel falling within the range of a correlation bin is associated with the actual intensity level corresponding to the correlation bin. The error based upon the difference between the desired intensity level and the actual intensity level is preferably diffused to neighboring unprocessed pels.

Also, for both the bi-level and multi-level embodiments the order of processing individual pels and the error diffusion matrix are preferably both reversed for each subsequent line of pels. It has been found that each one and various combinations of these features significantly improves image clarity, sharpness and tone continuity.

Figure 1:
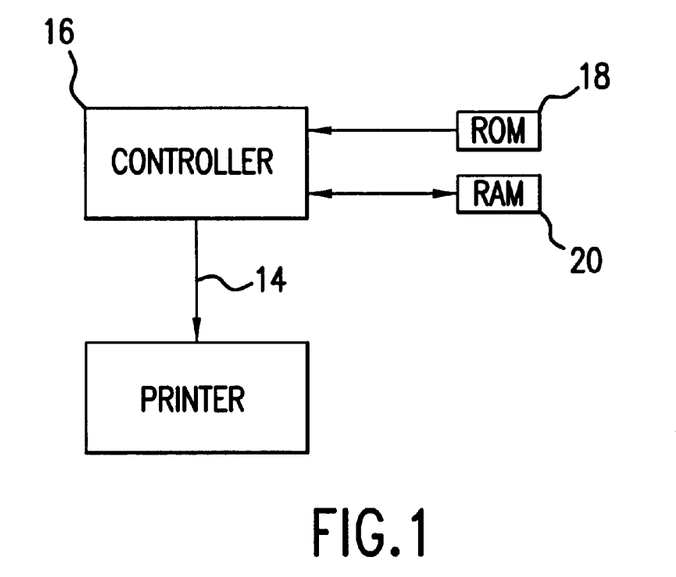
FIG. 1 is a block diagram of an apparatus for printing color images according to an embodiment of the invention.

A color imaging system 10 according to an embodiment of the present invention is shown in FIG. 1, wherein a printer 12 is coupled by print data line 14 to a controller 16. The controller 16 is coupled to (or includes as an integral part thereof) a read-only-memory ROM 18 and a random-access-memory RAM 20. The controller has an input port or ports (not shown) for receiving various input data described below.

In general, the controller 16 responds to image data received at the input port (or stored in RAM 20) and, with reference to a suitable kernel and a threshold value (e.g., stored in RAM 20), provides print data on line 14 to the printer 12. In this regard, the controller 16 may include, for example, a processor (such as a suitable microprocessor, processing circuitry, logic circuitry, or the like), read and write circuitry for communicating with the RAM 20 and the ROM 18, and suitable input/output circuitry to communicate print data to the printer 12 and to receive various input data.

The controller 16 is controlled according to an operating program stored in the ROM 18. In preferred embodiments, the input port of the controller 16 is adapted to receive data corresponding to the "desired" enhancement level of each pel (i.e., the enhancement state of each pel in the "desired" image). Such data may be provided as, for example, a graphics-type print job generated at a personal computer equipped work-station, a scanned image from an image scanner, or as any other suitable image to be displayed or printed in graphic form.

In preferred embodiments, the controller 16 and memory devices 18 and 20 are provided as part of a conventional personal computer or other host computer system, or as additional components added to such computer systems. In further embodiments, the controller 16 and memory devices 18 and 20 may be provided as part of the printer, or as additional components added between the printer driver and the source of the "desired" image data. In further preferred embodiments, the controller 16 and memory devices 18 and 20 may be implemented on a single silicon chip or circuit card, for example, for ready addition or replacement in a host computer or printer housing. It will be understood that in each of the above embodiments, other memory or storage means may be employed (as an alternative to the ROM 18 and the RAM 20), such as well known optical or magnetic recording devices.

In operation, each channel (e.g., RGB color channel, such as red, green or blue channels; or Lab channel, such as luminance, red direction and blue direction channels; or other suitable channel division) of an image is treated individually. For each channel, a suitable error diffusion kernel is selected and stored in RAM 20. The same error diffusion kernel may be employed for each color channel of the image. The "desired" pel enhancement level data for each pel of at least a portion of the image (and, preferably, of the entire image) is entered, via input 22, to the controller 16 and is subsequently stored in RAM 20.

Error diffusion kernel values (such as those discussed above with respect to the Floyd et al. kernel or the Jarvis et al. kernel, or other suitable kernels) may be entered via input 22 and stored in RAM 20 for each print job (or for each color channel of each print job). Alternatively, one or plural kernels may be pre-stored in the RAM 20 or in the ROM 18.

Figure 2:
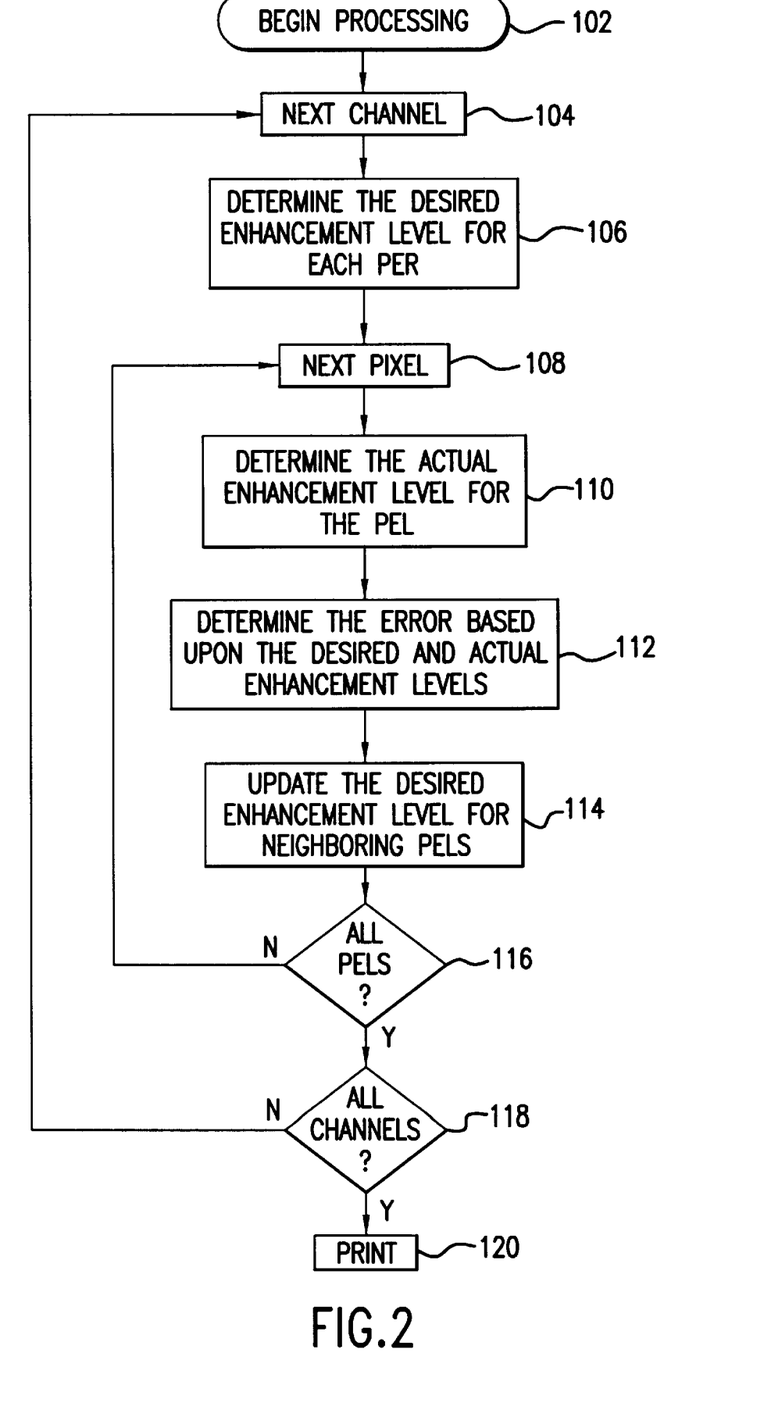
FIG. 2 shows a block flow diagram of a preferred process of determining actual enhancement levels to be printed as performed in the embodiment of FIG. 1.

The embodiment of FIG. 1 preferably performs the color imaging process according to the flow diagram of FIG. 2. (A similar process may be carried out for black and white images, e.g., with a single channel.) The processing begins at step 102 for processing a multi-channel color image having a plurality of pels distributed thereon. The determination of the actual enhancement levels for the pels of each color channel is performed for the entire image, one channel at a time. Accordingly, at step 104 processing for a new channel commences. At step 106, the desired enhancement level for each pel in the channel is determined. The controller 16 may retrieve the desired enhancement levels for each pel from the RAM 20. Pel by pel processing commences at step 108 where actual enhancement levels are determined for each pel and errors are diffused to the unprocessed neighboring pels.

One embodiment of the present invention represents each desired level of intensity (one per channel) for each pel as an eight bit word. Accordingly, a desired enhancement level for each pel in a channel may assume one of 256 discrete values. Other embodiments may employ words of fewer or more bits. The printer 12 may only be able to provide much fewer actual enhancement levels. For example, a printer having a bi-level system can only print at two levels, no printing at all or a solid dot. A multi-level printer, as discussed in greater detail below, may be limited to a specific number of different levels, such as only be able to print at three or six levels for any channel on a particular pel area. Accordingly, step 110 preferably determines the actual enhancement level for each pel which most closely approximates the desired enhancement level as indicated by the corresponding eight bit word. Step 112 then determines the error based upon the desired enhancement level and the actual enhancement level that most closely approximates the desired enhancement level. Step 114 then updates or modifies the desired enhancement level for the neighboring pels which have not yet been processed according to a suitable kernel as discussed above.

The controller 16 preferably performs steps 116 through 116 to process each pel in the image for a particular channel. When processing for a channel completes, the controller 116 preferably returns to step 104 to commence processing of the next channel. Upon completion of processing of all channels determined at step 118, controller 116 may command the printer 12 to commence printing according to the actual enhancement levels determined for each pel for each channel as determined at steps 116 through 114. Alternatively, steps 106 through 116 may be performed for all channels simultaneously in a parallel fashion.

Bi-level Printing

Embodiments of bi-level printing are described in detail in copending application Ser. No. 08/088,463 (incorporated herein by reference). In general, according to preferred bi-level printer embodiments discussed in the above-referenced '463 application, the controller 16 determines a threshold based upon the print data input, a preselected kernel and a predetermined threshold level. The controller 16 outputs print data on line 14, corresponding to the actual bi-level state of each pel in the printed image. Predetermined threshold levels may be entered via input 22 or, alternatively, pre-stored in RAM 20 or ROM 18. As yet another alternative, the controller 16 calculates threshold values based on the minimum and maximum enhancement levels of a plurality of pels, as discussed below.

The printer 12 may be a standard bi-level printer, for example, a solid ink printer of the type sold by the assignee, Dataproducts Corporation, as model JOLT PS (or other suitable printer or image forming device). The bi-level print data, including the "actual" bi-level pel enhancement states, is rendered by the controller 16, remote from the printer.

The controller 16 determines the minimum and the maximum level of "desired" enhancement of all of those pels for which data was received at input 22 and for which the data specifies at least some level of enhancement above a non-enhanced level. As discussed above, the desired intensity of a pel for a channel may be represented by an 8 bit word, providing 256 levels of enhancement. Thus, for each channel, each pel of the "desired" image has an enhancement level somewhere within the range of 0 and 255. Data corresponding to these 256 possible pel enhancement levels are converted by the controller 16 into bi-level data for controlling the bi-level printer.

One possible procedure for converting data corresponding to one of the 256 "desired" pel enhancement levels to data corresponding to one of the two bi-level values is by comparison of the "desired" enhancement level data with the mid-point of the 0 to 255 range of possible values of the "desired" enhancement level data. That is, a determination is made as to which side of the mid-point between 0 and 255 (i.e., 127) the "desired" pel enhancement level falls. If the "desired" pel enhancement level is greater than 127, then the corresponding "actual" printed pel will have a fully enhanced state (e.g., corresponding to level 255). If the "desired" pel enhancement level is less than 127, then the corresponding "actual" printed pel will have an non-enhanced state (e.g., corresponding to level 0). The error between the "actual" state (0 or 255) of the printed pel and the "desired" enhancement level is distributed among neighboring pels, at weight levels dictated by a suitable error diffusion kernel.

The error factors calculated for any one pel are combined with the "desired" enhancement level data for that pel before comparison with the mid-point level 127. Thus, if the "desired" enhancement level of a pel, as modified by any error diffusion calculations performed upon determining the state of neighboring pels, falls below (or above) the mid-point level 127, then the "actual" state of the corresponding printed pel will be 0 (or 255).

In the above example, the mid-point (127) between all possible enhancement values (0 to 255) was used as a "threshold" value to determine whether the "actual" enhancement state of each pel in the printed image. However, according to preferred embodiments of the present invention, significantly improved image clarity, tone continuity and image sharpness may be provided where the "threshold" value is determined as the mid-point between the minimum and maximum enhancement levels of all of those pels for which data was received at input 22 and for which the data specifies at least some level of enhancement above a non-enhanced level (rather than the mid-point, 127, of the range, 0 to 255, of "possible" enhancement levels).

Figure 3:
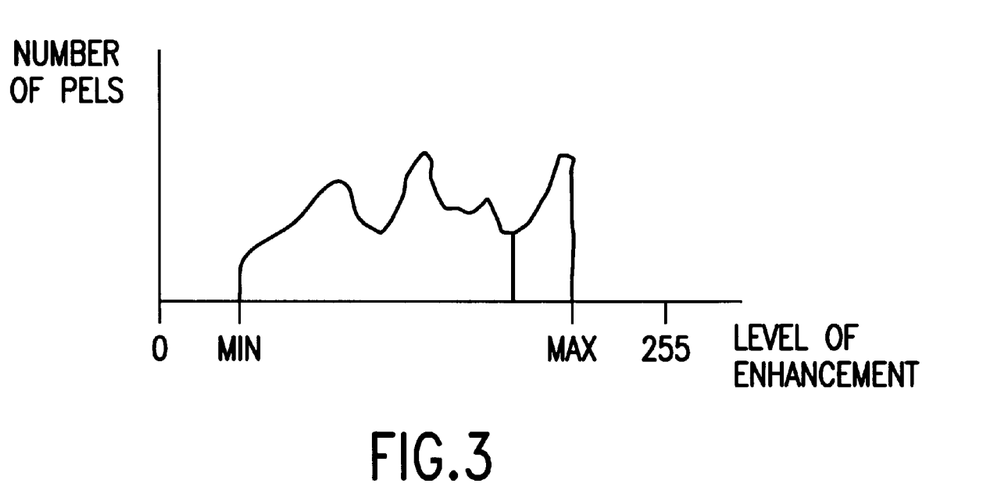
FIG. 3 shows a plot of the pel enhancement level values versus numbers of pels.

For example, if one were to plot the quantity of pels versus pel enhancement levels for all or a portion of an image for any one channel (e.g., RGB or Lab channel), the plot might appear as shown in FIG. 3. Referring to FIG. 3, the plot extends (continuously or discontinuously) from a minimum enhancement level value MIN to a maximum enhancement level value MAX. According to a preferred embodiment of the invention, instead of employing the midpoint (e.g., 127) of the range (e.g., 0 to 255) of possible enhancement level values, the "threshold" is determined, individually for each channel, by the following formula:

$$\frac{MAX - MIN}{2}$$

Thus, in preferred embodiments, the "actual" enhancement level of a pel will be low (e.g., 0) when the "desired" enhancement level of the pel (the enhancement level of the pel in the "desired" image), as modified by any error diffusion factors provided from the previous processing of neighboring pels, falls below the "threshold" determined by (MAX−MIN)/2. Similarly, the "actual" enhancement level of a pel will be high (e.g., 255) when the "desired" enhancement level of the pel (the enhancement level of the pel in the "desired" image), as modified by any error diffusion factors provided from the previous processing of neighboring pels, falls at or above the "threshold" determined by (MAX−MIN)/2. The determination of the (MAX−MIN)/2 value may be performed by the controller, based on the maximum and minimum pel enhancement levels for image data stored in RAM 20. Alternatively, the (MAX−MIN)/2 value may be calculated externally and entered, via input 22.

Multi-level Printing

As noted above, preferred embodiments of the present invention are directed to a multi-level printing system, in which the printer 12 is capable of printing more than two intensity levels for a particular channel for a particular pel. The multi-level printing embodiment may be used in an interlaced dot-on-dot printing technique such as that described in U.S. Pat. No. 5,485,183 (incorporated herein by reference), which is assigned to Dataproducts Corporation or that employed in the jolt printer sold by Dataproducts Corporation. Such a printer forms images on a medium by depositing rows of ink dots in a desired pattern. Printers of this type typically include a print head provided with an array of nozzles for ejecting ink droplets toward the printing medium. During relative movement between the print head and the printing medium, each nozzle traverses a line, or a pel row, on the printing medium and deposits ink drops at desired locations, or pel areas, along that row. Bands of ink dots are formed on the print medium by affecting a relative displacement between the print head and the print medium. Typically, a print head is moved across a print medium in one or more "printing passes" as drops of ink are ejected from the head to form dots on the print medium.

Figure 4:
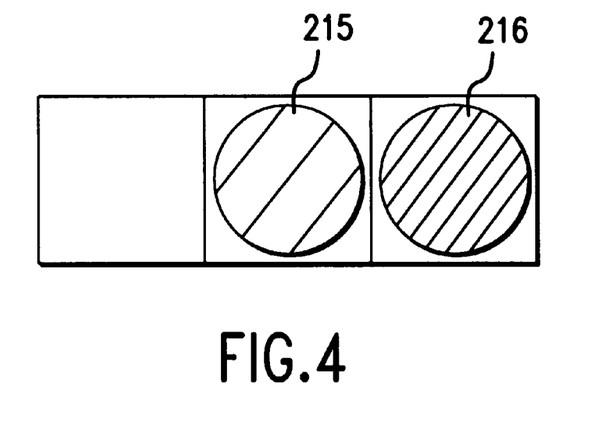
FIG. 4 shows ink dot combinations for an embodiment using an interlaced dot-on-dot technique capable of providing three actual intensity levels for a channel.

Among the techniques which have been developed for performing multi-level printing are interlaced techniques in which the spacing between the nozzles is such that alternate pixel rows are printed during one printing pass, and interleaving pixel rows are printed during a subsequent printing pass. In order to illustrate several combinations which may exist in a pel area, ink dots shown in FIG. 4 include dots 215, which are formed from a single drop of ink (these dots being represented by wide hatching), and dots 216, composed of two successively applied drops of ink (represented by narrower hatching). The dots 216 are preferably composed of two successively applied drops (applied at the same pel location in two successive printing passes) of about the same volume of ink having the same color. In this manner, the enhancement level in the pel area may have one of three levels as shown in FIG. 4. The lowest level results when no ink drops are deposited (the left-most box in FIG. 4). A single drop of ink as shown in dots 215 provides the next enhancement level (the middle box in FIG. 4). Two successive deposited dots of the same color as in dot 216 provide the highest enhancement level (the right-most box in FIG. 4).

Figure 5:
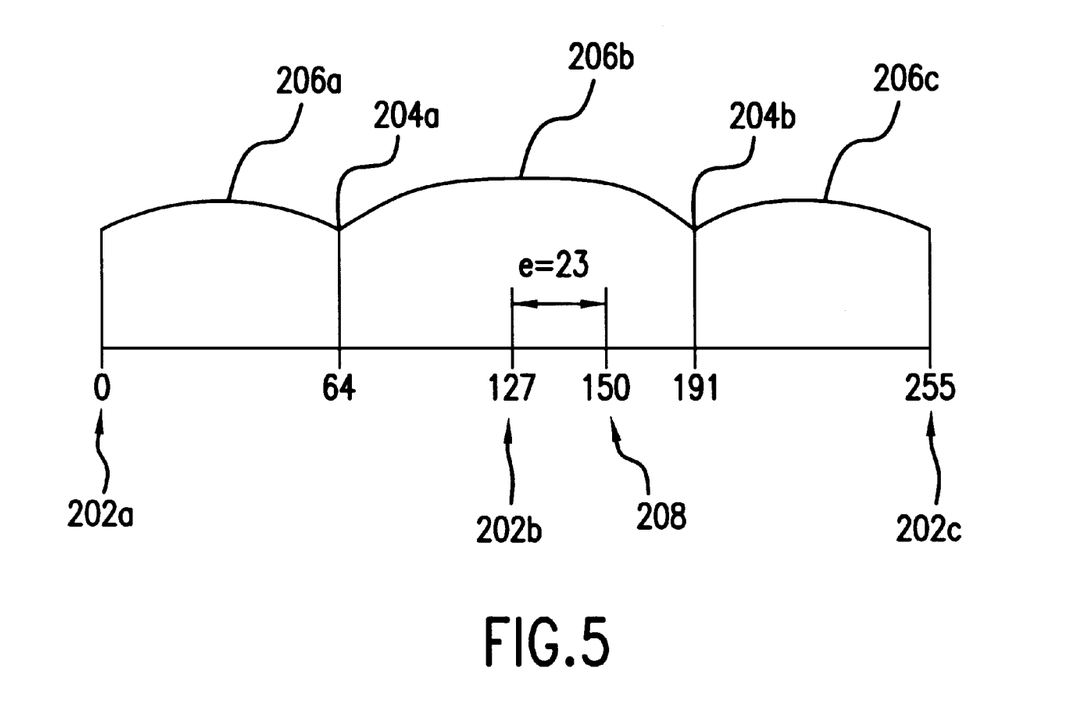
FIG. 5 shows the formation of thresholds and correlation bins based upon the actual enhancement levels according to an embodiment having a printer capable of providing three actual intensity levels for a channel as in the embodiment of FIG. 4.

FIG. 5 shows a scale from 0 to 255 representing 256 discrete intensity levels defined by an eight bit representation of the desired intensity level of a pel for a particular channel. Actual enhancement levels at 202a, 202b and 202c have been defined, for the purposes of illustration, to have values of 0, 127 and 255, respectively. In other embodiments, the actual enhancement levels may have other values depending on the dot size, ink type or other factors. The relative spacings of the actual enhancement intensities distributed along the scale of 0 to 255 define multiple thresholds 204a and 204b. In one embodiment, thresholds are defined at mid-points between consecutive actual enhancement intensity values along the scale. For example, the threshold value at 204a, having a value of 64, is at about the midpoint between the actual intensity at 202a, having a value of 0, and the actual intensity at 202b, having a value of 127. Alternatively, the thresholds may be set at other locations to weight the selection of certain values.

The thresholds 204a through 204b define correlation bins 206a, 206b and 206c. Accordingly, there is a corresponding bin 206 for each actual enhancement level 202. Hence, at step 110 (FIG. 2), an actual enhancement level 202 is selected when a desired enhancement level falls within the range of its corresponding correlation bin 206. For example, a desired enhancement level 208 falls within the range of correlation bin 206b. Hence, the actual enhancement level 202b, having a value of 127, is selected.

Alternatively, the actual enhancement level may be selected based upon whether the desired enhancement level exceeds certain thresholds 204. Each actual level of intensity 202 is associated with an upper threshold and a lower threshold. For example, the actual enhancement level 202b is associated with threshold 204a as a lower threshold and threshold 204b as an upper threshold. As the desired enhancement level 208 exceeds threshold 204a but does not exceed threshold 204b, the associated actual enhancement level 202b is selected. Under such a scheme the endpoints of the scale of desired levels of enhancement, 202a and 202c, are considered to be thresholds.

In the example shown in FIG. 5, the desired enhancement level 208 has a value of 150 on the scale of 0 to 255. This places the desired enhancement level in bin 206b, corresponding to the actual enhancement level 202b with a value of 127. Then, at step 112 (FIG. 2), the error is determined as the difference between the desired enhancement level 208, having a value of 150, and the actual enhancement level 202b, having a value of 127, which is equal to 23. Step 114 then diffuses this error among the neighboring pels by updating or modifying the respective desired enhancement levels for future processing.

In the embodiment shown in FIGS. 4 and 5, the controller 16 may represent the selected enhancement level in signals to the printer 12 using two bits. According to an embodiment, a first bit determines whether a dot is deposited in the first pass and a second bit determines whether a dot is to be deposited in the second pass. For example, if the first bit is 0, no ink is to be deposited on the pel area. If the first bit is 1 and the second bit is 0, one drop is to be deposited in the pel area in the first pass and nothing is to be deposited in the second pass. If both bits are 1, a drop of ink is to be deposited in the pel area on both the first and second passes to form an enhanced (dot-on-dot) dot as discussed above in connection with the dots 216.

Figure 6:
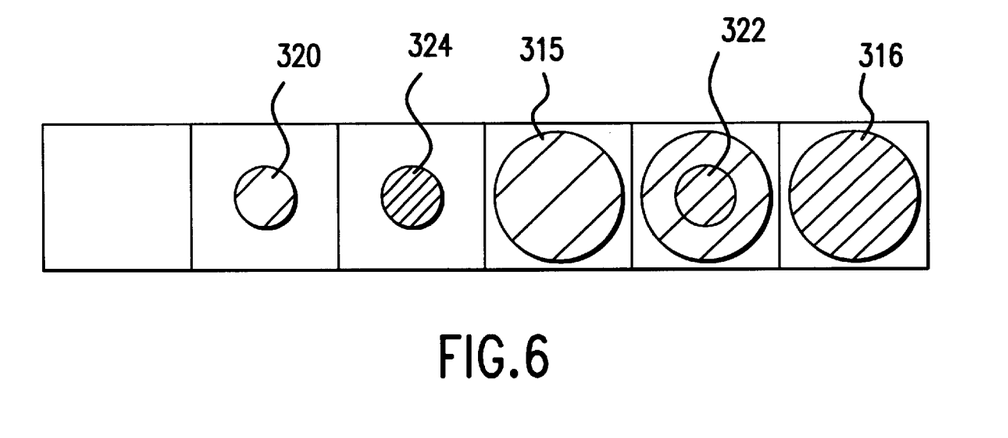
FIG. 6 shows ink dot combinations for an embodiment using an interlaced dot-on-dot technique capable of providing six actual intensity levels for a channel.

According to a second technique employed in the practice of preferred embodiments of the present invention, the quantity of ink in each ink drop can be altered in order to correspondingly alter the size of the resulting ink dot. Thus, various combinations of different sized ink dots can be employed to produce different apparent intensity levels. For example, as shown in FIG. 6, dot 315 is a full sized dot formed from a single ink drop. Dot 320 is a smaller dot formed by an ink drop having a reduced volume. An elemental pel area containing a dot 320 will appear to have a lower apparent color or dot intensity than an elemental pel area containing a full sized dot 315. This second technique is practiced with a printer capable of printing at least two dot sizes.

Additionally, on a selected pel area, two single large dots 315 may be printed upon one another to form a dot 316 having the highest level of intensity on the selected pel. A full sized dot 315 and a smaller dot 320 may be printed upon one another on a selected pel to form a dot 322 having a higher intensity than a dot 315 but a lower intensity than the dot 316. Here again, the two dots applied to a pel area can be of the same color to vary the intensity level for the channel. A pel area may also be provided with a smaller sized dot 324 formed from two successively applied ink drops which each contain a smaller volume of ink to provide an additional intensity level.

Figure 7:
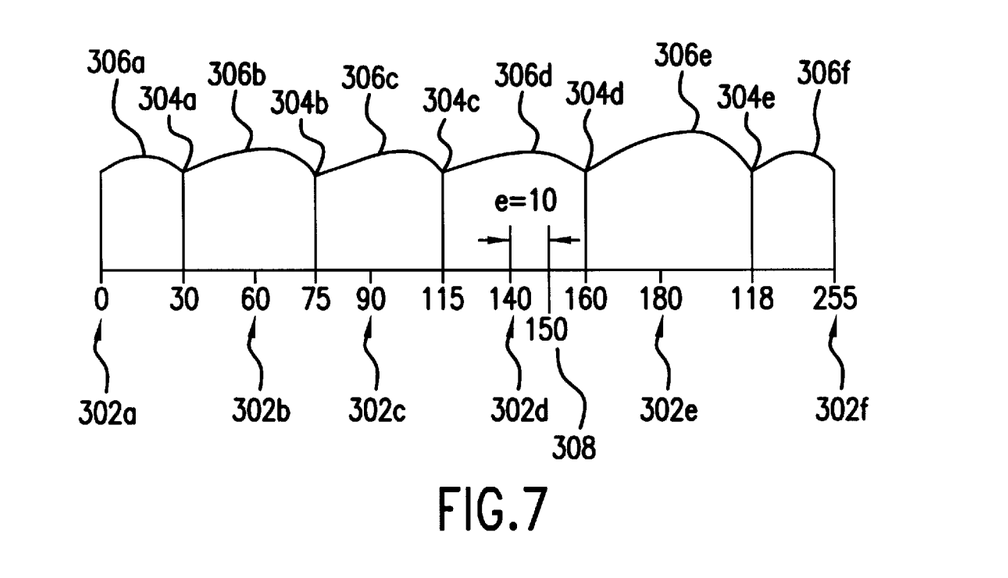
FIG. 7 shows the formation of thresholds and correlation bins based upon the actual enhancement levels according to an embodiment having a printer capable of providing six actual intensity levels for a channel as in the embodiment of FIG. 6.

FIG. 7 shows a distribution of actual enhancement levels 302a through 302f on a scale from 0 to 255 which may correspond to the multi-level printer embodiment of FIG. 6. As in the embodiment of FIGS. 4 and 5, a desired enhancement level for a particular pel may be one of 256 values as determined by an eight bit word. However, the embodiment of FIGS. 6 and 7 provides only six actual levels of intensity.

Accordingly, the actual intensity level at 302a, having a value of 0, may correspond to depositing no dots of ink in a pel area. The actual intensity level at 302b, having a value of 60, may correspond to the depositing of a single dot 320. The actual intensity level 302c, having a value of 90, may correspond to depositing two single small dots 324. The actual intensity level 302d, having a value of 140, may correspond to depositing a single large dot 315. The actual intensity level 302e, having a value of 180, may correspond to depositing a single small dot on top of a single large dot as shown in 322. The actual intensity level 302f, having the value of 255, may correspond to depositing two large dots in the same pel area as shown at 316.

As discussed above in connection with FIG. 5, correlation bins 306a through 306f correspond with respective actual enhancement levels 302a through 302f. Threshold values 304a through 304e, having values of 30, 75, 115, 160 and 218 respectively, define the correlation bins 306a to 306f.

Alternatively, the actual enhancement level may be selected based upon whether the desired enhancement level exceeds certain thresholds 304. Each actual level of intensity 302 is associated with an upper threshold and a lower threshold. For example, the actual enhancement level 302d is associated with threshold 304c as a lower threshold and threshold 304d as an upper threshold. As the desired enhancement level 308 exceeds threshold 304c but does not exceed threshold 304d, the associated actual enhancement level 302d is selected. It understood that under such a scheme the endpoints of the scale of desired levels of enhancement, 302a and 302f, are considered to be thresholds.

In the example shown in FIG. 7, the desired enhancement level 308 has a value of 150 on the scale of 0 to 255. This places the desired enhancement level in correlation bin 306b, corresponding to the actual enhancement value of 140 at 302d. Accordingly, the actual enhancement value is selected as 140. Then, at step 112 (FIG. 2), the error is determined as the difference between the desired enhancement level 308, having a value of 150, and the actual enhancement level 302d, having a value of 140, which is equal to 10. Step 114 then diffuses this error among the neighboring pels by modifying the respective desired enhancement levels for future processing.

In the embodiment of FIGS. 6 and 7, the controller 16 may represent the selected enhancement level for a pel to the printer 12 using four bits, two bits in each of the two passes. A signal representing 00 for the first pass may indicate that no ink is to be deposited. A signal representing 01 for the first pass may indicate that a single small dot such as dot 320 (FIG. 6) is to be deposited in the first pass. A signal representing 10 for the first pass may indicate that a single large dot such as dot 315 is to be deposited in the first pass.

According to an embodiment, if any ink is to be deposited on the pel area, at least some of the ink is deposited in the first pass. Hence, it is understood that if no ink is to be deposited in the first pass (as indicated by a signal representing 00), no ink is to be deposited in the second pass. A signal representing 01 for the second pass may indicate that a single small dot is to be deposited in the second pass. A signal representing 10 for the second pass may indicate that a single large dot is to be deposited in the second pass.

According to the four bit representation of the ink deposited in the first and second passes, 01 for the first pass and 00 for the second pass (i.e., the four bit representation 0100) may indicate that a single small dot 320 (FIG. 6) is to result from the two passes. A 10 for the first pass and a 00 for the second pass (i.e., the four bit representation 1000) may indicate that a single large dot 315 is to result from the two passes. A 01 for the first pass and a 01 for the second pass (i.e., the four bit representation 0101) may indicate that two interlaced small dots 324 are to result from the two passes. A 10 for the first pass and a 01 for the second pass (i.e., the four bit representation 1001) may indicate that a small dot (from the second pass) is to be printed on top of a large dot (from the first pass) to result in the dots 322 from the two passes. A 10 for the first pass and a 10 for the second pass (i.e., the four bit representation 1010) may indicate that a large dot is to be printed in each of the two passes to provide two large dots 316 printed in a pel area.

It is understood that in the embodiments of FIGS. 4 through 7 that the threshold and correlation bins may be independently determined for each of the channels to accommodate the particular color properties of the ink used in each channel. It is also understood that the actual levels of intensities may be independently determined for each channel. It is further understood that the techniques of FIGS. 4 through 7 may be applied to printing systems capable of providing more than six levels of intensities for a particular pel.

Figure 8:
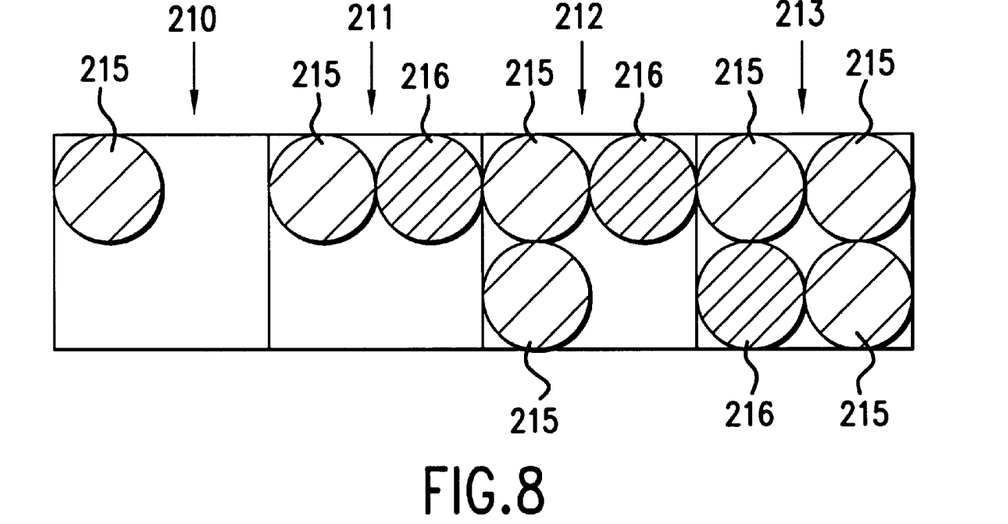
FIG. 8 shows the formation of super pels comprising four pels based upon the dot-on-dot technique of FIG. 4 to provide additional actual intensity levels for an area defined by a super pel.
Figure 9:
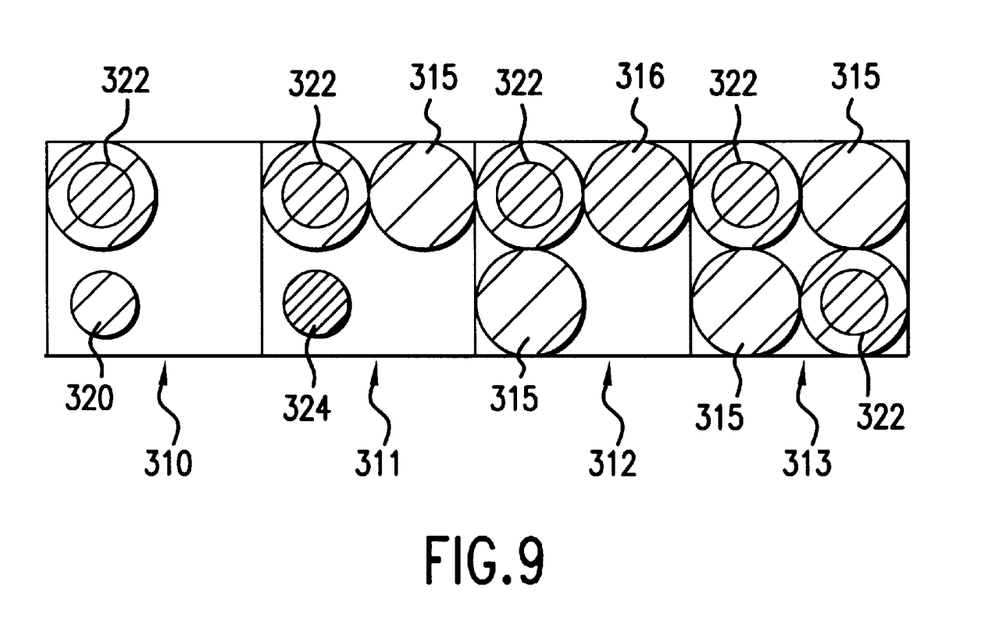
FIG. 9 shows the formation of super pels comprising four pels based upon the dot-on-dot technique of FIG. 6 to provide additional actual intensity levels for an area defined by a super pel.

In another embodiment shown in FIGS. 8 and 9, the plane of the print medium is partitioned into "super pel" regions having multiple pels. FIG. 8 shows the formation of super pel regions 210 through 213 based upon the dot-on-dot technique discussed above with reference to FIG. 4. FIG. 9 shows the formation of super pel regions 310 through 313 based upon the dot-on-dot technique discussed above with reference to FIG. 6. This is described in detail in U.S. Pat. No. 5,485,183 assigned to Dataproducts Corporation. Since each super pel region includes four single pel regions, many more enhancement levels are possible for each super pel region than is possible for a single pel. Thus, as each pel region in the embodiment of FIG. 4 may have one of three enhancement levels, the super pel regions 210 through 213 of FIG. 8 may have one of many more than three enhancement levels. Similarly, as each pel region in the embodiment of FIG. 6 may have one of six enhancement levels, the super pel regions 310 through 322 of FIG. 9 may have one of many more than six enhancement levels.

It is understood that while the super pels shown in FIGS. 8 and 9 comprise four pixels each, a super pel may be defined to comprise more than four pels. As the number of pels in a super pel increases, additional actual levels of enhancement over the super pel region are possible.

Accordingly, similar to the process described with reference to FIGS. 5 and 7, desired levels of intensity over a super pel region may have one of 255 values. Each actual enhancement level over a super pel corresponds to a correlation bin and/or a pair of upper and lower thresholds. Each desired enhancement level of a super pel within the range of a correlation bin is associated with the corresponding actual enhancement level. The difference between the desired enhancement level and the associated actual enhancement is the error which is distributed to unprocessed neighboring super pels according to a suitable kernel in a process similar to that described above with reference to FIG. 2.

In an alternative to the dot on dot method described above, an embodiment of the present invention may be directed to a multi-level printing technique employed in a laser printer which uses a single pass printing technique. In such a laser printer system, the size of a laser dot is preferably modulated to discrete sizes to provide actual intensity levels.

Reverse Direction Kernel Processing

According to further embodiments of the present invention, additional improvements in image clarity, tone continuity and image sharpness, especially near the outer peripheral edges of the image, may be accomplished by programming the controller 16 to reverse the direction of processing individual pels (or super pels) in a line of pets (or super pets) and reversing the error diffusion matrix for each subsequent line of pels (or super pels) at step 114 (FIG. 2).

For example, consider a system wherein the controller 16 processes each pel (or super pet) in a line (or column) of pels (or super pels) (i.e., provides multi-level pel enhancement print data from the "desired" pel (or super pel) enhancement print data for each pel (or super pel) in the line or column). In such a system, the pels (or super pels) in a particular line (or column) may be processed from left to right (or from top to bottom), using the above described Floyd et al. error diffusion matrix, as shown below:

line-by-line

```
    *  7
 3  5  1
``` column-by-column

```
    3
 *  5
 7  1
```

In preferred embodiments of the present invention, the next line (or column) of pels processed by the controller 16 is processed in the reverse direction relative to the direction of processing of the preceding line (or column), e.g., from right to left (or from bottom to top) using a reversed (or mirror image) matrix, as follows:

line-by-line

```
 7  *
 1  5  3
``` column-by-column

```
    3
 5  *
 1  7
```

The process of reversing the direction of pel (or super pel) processing and reversing the error diffusion matrix for each subsequent line or column of pels (or super pels) contributes to significant improvements in image clarity, tone continuity and image sharpness, especially near the outer peripheral edges of the image.

As discussed above, in preferred embodiments, each color channel is processed individually using a suitable error diffusion matrix at steps 106 through 116 (FIG. 2). In the bi-level printing embodiment, a "threshold" value determined by (MAX−MIN)/2 is calculated for each channel independent of the other channels. In the multi-level printing embodiment, predetermined threshold values define correlation bins independently for each channel.

Furthermore, in the bi-level and multi-level techniques, the direction of processing and the error diffusion matrix are reversed for each subsequent line or column of pels. In combination, these features provide markedly improved image forming quality, preferably for printer systems, video imaging systems or other electronic imaging systems. In addition, each one and various combinations of the above features has been found to significantly improve image clarity, sharpness and tone continuity.

In further preferred embodiments, one or more channels may be weighted greater than the others to emphasize that channel in the resulting image. Further clarity, sharpness and continuity may be accomplished by adjusting, e.g., the weight factors employed in the selected kernel. In the bi-level printing embodiment, the threshold value for one or all channels, to accommodate, for example, the dot size or dot spacing limitations of the printer or other image forming device being used. As an example, a preferred embodiment may employ a printer which produces a dot size of about 3.4 mils and a dot spacing of about 180 DPI (dots per inch). In the multi-level printing embodiment, threshold locations and the resulting correlation bins may be adjusted to accommodate similar dot size or spacing limitations.

In various printer or image forming applications, it may be desirable to provide print data in a CMYK (cyan, magenta, yellow and black) printer bit map. This can be accomplished by either processing C, M, Y and K channels separately, as discussed above with respect to the RGB channels, or by converting a 24 bit color bitmap (formed of 8 bits R, 8 bits G, and 8 bits B, processed as discussed above) into a CMYK printer bit map according to well known processes.

The presently disclosed embodiments are to be considered in all respects as illustrative and not restrictive. The scope of the invention being indicated by the appended claims, rather than the foregoing description, and all changes which come within the meaning and range of equivalency of the claims are, therefore, intended to be embraced therein.

What is claimed is:

1. A method for processing image data depending upon a plurality of predetermined error diffusion kernels to provide image data for an image display device, wherein the image data corresponds to a desired color image formed of plural picture elements (pels) in each of a plurality of channels, each of the plurality of error diffusion kernels corresponding to exactly one of the channels each pel corresponding to an area on the color image, and includes data corresponding to a desired level of enhancement of each pel in the desired image for each of the plural channels, the method comprising the steps of:

determining for each channel and per image data at least three actual enhancement levels ranging from a low intensity to a high intensity, said actual enhancement levels including a first level corresponding to printing two dots in a pel area, a second level corresponding to printing a single dot in a pel area, and a third level corresponding to printing no dot in a pel area;

modifying the desired level of enhancement for each pel of each channel based upon differences between the actual level of enhancement and the desired level of enhancement for at least one neighboring pel;

correlating the modified desired level of enhancement in each pel of each of the channels with one of said actual levels of enhancement by:

determining at least three ranges of desired levels of enhancement, each range corresponding to exactly one of said actual levels of enhancement, the ranges being mutually exclusive and contiguous between the low intensity and the high intensity;

determining the range which includes the modified desired level of enhancement; and associating the modified desired level of enhancement with the actual level of enhancement corresponding to the range including the desired level of enhancement;

calculating multi-level enhancement data for each channel by generating data corresponding to the actual level of enhancement which correlates with the modified desired level of enhancement; and transferring the multi-level enhancement data to the image display device.

2. The method of claim 1, wherein the correlating step further comprises:

determining threshold values partitioning consecutive said actual levels of enhancement such that each of said actual levels of enhancement is associated with an upper threshold and a lower threshold;

selecting the actual level of enhancement for which the modified desired level of enhancement exceeds the lower threshold associated with the selected actual level of enhancement and does not exceed the upper threshold associated with the selected actual level of enhancement; and associating the selected actual level of enhancement with the modified desired level of enhancement.

3. The method of claim 1, further comprising the step of depositing drops of ink onto a medium using a two pass interlaced dot-on-dot technique.

4. The method of claim 3, wherein the step of depositing drops of ink comprises selectively depositing single sized drops in either of the two passes.

5. The method of claim 1, wherein the image display device includes a laser printer, the method further comprising printing in each pel on a single pass.

6. A method for processing image data depending upon at least one predetermined error diffusion kernel to provide image data for an image display device wherein the image data corresponds to a desired color image formed of plural picture elements (pels) in each of a plurality of channels, each pel corresponding to an area on the color image, and includes data corresponding to a desired level of enhancement of each pel in the desired image for each of the plural channels, wherein the at least one predetermined error diffusion kernel comprises a matrix of error distribution values and the desired image is formed of plural pels in at least first and second adjacent lines of pels, the method comprising:

determining for each channel and per image data a plurality of actual enhancement levels ranging from a low intensity to a high intensity, said plurality of actual enhancement levels including a first level corresponding to printing two dots in a pel area, a second level corresponding to printing a single dot in a pel area, and a third level corresponding to printing no dot in a pel area;

correlating the desired level of enhancement in each pel of each of the channels with one of said actual levels of enhancement;

calculating multi-level enhancement data for each channel by generating data corresponding to the actual level of enhancement which correlates with the desired level of enhancement, the step of calculating the multi-level enhancement data including:

determining the multi-level enhancement data for the pels of the first line according to the matrix of error distribution values;

reversing the matrix of error distribution values from which the multi-level enhancement data is determined for the pels of the first line; and determining the multi-level enhancement data for the pels of the second line according to the reversed matrix of error distribution values; and transferring the multi-level enhancement data to the image display device.

7. A method for processing image data depending upon a plurality of predetermined error diffusion kernels to provide image data for an image display device, wherein the image data corresponds to a desired color image formed of plural picture elements (pels) in each of a plurality of channels, each of the plurality of channels corresponding with exactly one of the plurality of error diffusion kernels, each pel corresponding to an area on the color image, and includes data corresponding to a desired level of enhancement of each pel in the desired image for each of the plural channels, the method comprising the steps of:

determining for each channel and per image data at least six actual enhancement levels ranging from a low intensity to a high intensity, said actual enhancement levels including a first level corresponding to printing two large dots in a pel area, a second level corresponding to printing a single large dot and a single small dot in a pel area, a third level corresponding to printing two small dots in a pel area, a fourth level corresponding to printing a single large dot in a pel area, a fifth level corresponding to printing a single small dot in a pel area, and a sixth level corresponding to printing no dot in a pel area;

modifying the desired level of enhancement for each pel of each channel based upon differences between the actual level of enhancement and the desired level of enhancement for at least one neighboring pel;

correlating the modified desired level of enhancement in each pel of each of the channels with the actual level of enhancement by:

determining at least six ranges of desired levels of enhancement, each range corresponding to exactly one of said actual levels of enhancement, the ranges being mutually exclusive and contiguous between the low intensity and the high intensity;

determining the range which includes the modified desired level of enhancement; and associating the modified desired level of enhancement with the actual level of enhancement corresponding to the range including the desired level of enhancement;

calculating multi-level enhancement data for each channel by generating data corresponding to the actual level of enhancement which correlates with the modified desired level of enhancement; and transferring the multi-level enhancement data to the image display device.

8. The method of claim 7, wherein the correlating step further comprises:

determining threshold values partitioning consecutive said actual levels of enhancement such that each of said actual level of enhancement is associated with an upper threshold and a lower threshold;

selecting the actual level of enhancement for which the modified desired level of enhancement exceeds the lower threshold associated with the selected actual level of enhancement and does not exceed the upper threshold associated with the selected actual level of enhancement; and associating the selected actual level of enhancement with the modified desired level of enhancement.

9. The method of claim 7, further comprising the step of depositing drops of ink onto a medium using a two pass interlaced dot-on-dot technique.

10. The method of claim 9, wherein the step of depositing drops of ink comprises selectively depositing a large sized drop for printing a large dot in a pel area or a small sized drop for printing a small dot in the pel area in either of the two passes.

11. The method of claim 7, wherein the image display device includes a laser printer, the method further comprising printing in each pel on a single pass.

12. A method for processing image data depending upon at least one predetermined error diffusion kernel to provide image data for an image display device wherein the image data corresponds to a desired color image formed of plural picture elements (pels) in each of a plurality of channels each pel corresponding to an area on the color image, and includes data corresponding to a desired level of enhancement of each pel in the desired image for each of the plural channels, wherein the at least one predetermined error diffusion kernel comprises a matrix of error distribution values and the desired image is formed of plural pels in at least first and second adjacent lines of pels, the method comprising:

determining for each channel and per image data a plurality of actual enhancement levels ranging from a low intensity to a high intensity, said plurality of actual enhancement levels including a first level corresponding to printing two large dots in a pel area a second level corresponding to printing a single large dot and a single small dot in a pel area, a third level corresponding to printing two small dots in a pel area, a fourth level corresponding to printing a single large dot in a pel area, a fifth level corresponding to printing a single small dot in a pel area, and a sixth level corresponding to printing no dot in a pel area;

correlating the desired level of enhancement in each pel of each of the channels with the actual level of enhancement;

calculating multi-level enhancement data for each channel by generating data corresponding to the actual level of enhancement which correlates with the desired level of enhancement as follows:

determining the multi-level enhancement data for the pels of the first line according to the matrix of error distribution values;

reversing the matrix of error distribution values from which the multi-level enhancement data is determined for the pels of the first line; and determining the multi-level enhancement data for the pels of the second line according to the reversed matrix of error distribution values, and transferring the multi-level enhancement data to the image display device.

* * * * *